Sept. 7, 1948.          H. E. MAY                    2,448,816
             CONTINUOUS BLOWOFF VALVE FOR STEAM BOILERS
                        Filed Oct. 27, 1944
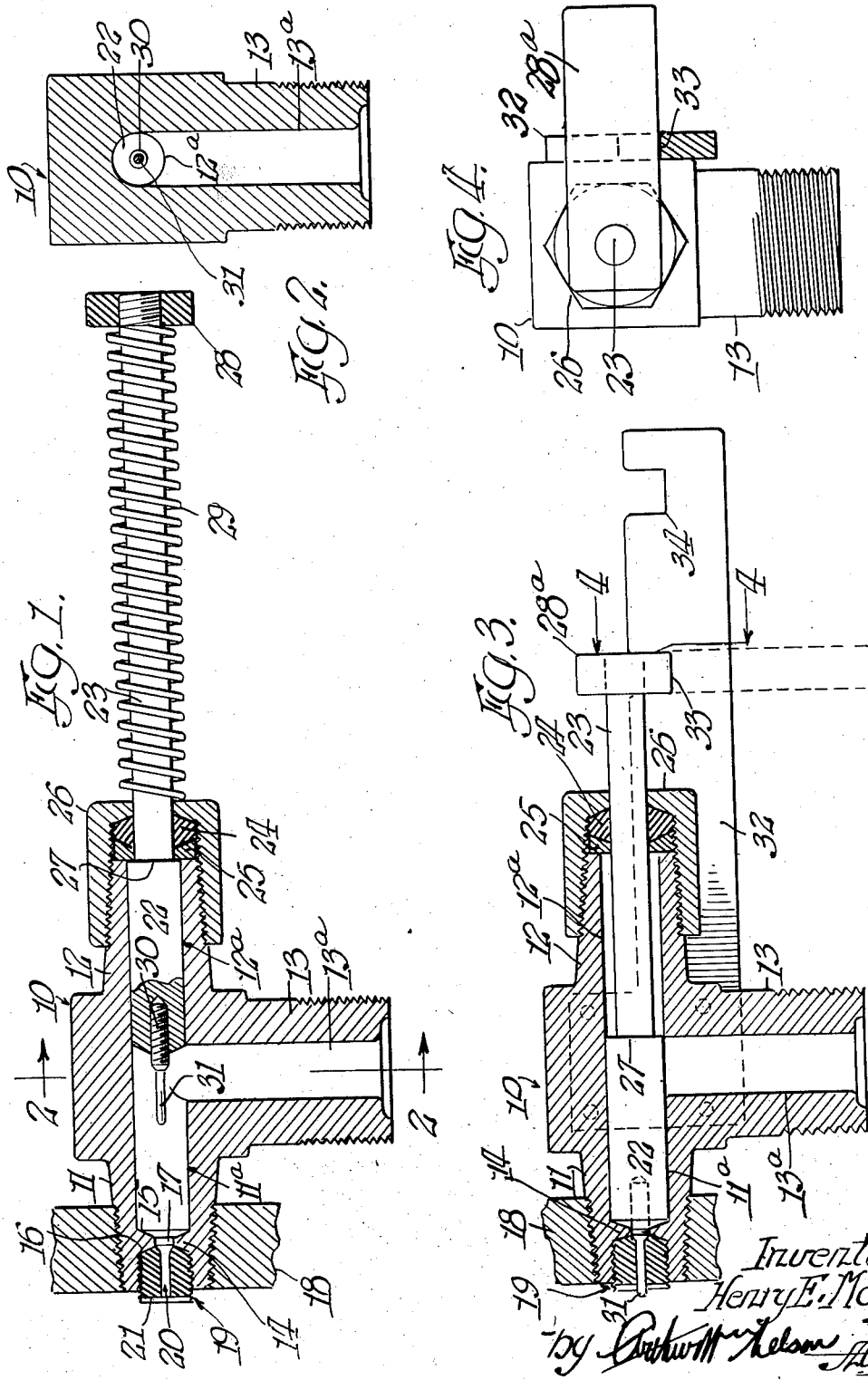
Inventor
Henry E. May Patented Sept. 7, 1948

2,448,816

UNITED STATES PATENT OFFICE 2,448,816

CONTINUOUS BLOWOFF VALVE FOR STEAM BOILERS

Henry E. May, Chicago, Ill., assignor to Dearborn Chemical Company, Chicago, Ill., a corporation of Illinois Application October 27, 1944, Serial No. 560,666

2 Claims. (Cl. 251—29)

1

This invention relates to improvements in blow off valve for steam boilers and it consists of the matters hereinafter described and more particularly pointed out in the appended claims.

One of the objects of the present invention is to provide a simple and efficient valve for the continuous blowdown of a steam boiler, such as a locomotive boiler, and which valve may be readily operated to remove or clean the accumulated foreign matter from the orifice thereof and which would otherwise clog the same and prevent the proper functioning of the valve.

Another object of the invention is to provide a valve of the kind which may be closed to cut off the blowdown when so desired.

Also it is an object of the invention to provide a valve of this kind wherein the packing thereof is so arranged in the valve as to prevent contact of boiler water therewith, thereby better preserving the functional characteristics of the packing which certain boiler waters tend to destroy.

Again it is an object of the invention to provide a valve of this kind wherein the shank of the plunger is formed to cooperate with a part of the valve body in such a manner that when the valve is closed no sludge or other foreign particle in the boiler water can accumulate in the flow orifice of the valve.

The above mentioned objects of the invention, as well as others, together with the advantages thereof, will more fully appear as the specification proceeds.

In the drawings:

Fig. 1 is a longitudinal vertical sectional view through a blow-off valve embodying the preferred form of the invention and showing the parts in position for the continuous blowdown of a steam boiler to which the valve is applied.

Fig. 2 is a transverse vertical sectional view through the valve of Fig. 1 as taken on the line 2—2 thereof.

Fig. 3 is a view similar to Fig. 1 showing a modified form of valve when the same is in a locked closed position and not depending on a spring for returning to locked open position.

Fig. 4 is a vertical detail sectional view through a part of the valve shown in Fig. 3 as taken on the line 4—4 thereof.

Referring now in detail to that embodiment of the invention illustrated in Figs. 1 and 2 of the drawings, the improved valve includes a T-shaped body 10 having alined water inlet and plunger receiving branches 11 and 12, respectively and a water outlet branch 13 disposed midway between

2 and perpendicular to the first mentioned branches. The branches 11 and 12 have alined bores 11a and 12a therein and the branch 13 has a bore 13a of the same diameter as the bores 11a and 12a or larger, when desired, and which communicate therewith in the body 10.

In the branch 11 a cross wall 14 is provided, having inner and outer tapered faces 15 and 16 respectively and a port 17 arranged axially of the bore 11a. In the branch 11, the cross wall 14 can be made integral with the branch 11 as shown, or it may be non-integral with said branch and in the form of a part which can be screwed, pressed or otherwise securely placed into position in said branch. The tapered faces 15 and 16 of a cross wall 14 may be modified to any degree of taper or made straight at right angles to the bore, when desired. The branch 11 is externally threaded for engagement in an opening in a part 18 of a boiler shell, from the outside thereof. In the extremity of said branch is a threaded plug 19 having a flow orifice 20 in line with but of a diameter slightly less than that of the port 17. The inner end of the plug is tapered to fit against the outer face 16 of the wall 14 and the outer end of the said plug is provided with a cross slot 21 by which the plug may be removed or replaced.

The outlet branch 13 is externally threaded to receive the nut of a union fitting (not shown) and by which a suitable discharge pipe may be attached to said branch. However, it is the intention to adapt the coupling design to branch 13 to accommodate whatever form of standard pipe connection, or coupling, as used in standard mechanical practice, that may be required.

Normally disposed in the bore 12a of the branch 12, for a sliding fit, is a plunger 22 of a length approximating that of said branch. This plunger is made as a part of a stem 23 that slides through a gland associated with the end of the branch and which includes a packing 24 confined in place between a retaining washer 25 and a nut 26 which has a threaded engagement upon the branch. When the parts mentioned are in place the washer 25 is held flush against the end of the branch, as appears in Fig. 1 and forms a stop for engagement by the junction shoulder 27 between the plunger 22 and its stem 23.

The free end of the stem is provided with a knob 28 and a helical expansion spring 29 surrounds the stem between the nut 26 and knob 28 and normally acts to urge the stem outwardly until limited in this movement by the engagement of the shoulder 27 against the washer 25. With this arrangement the gland is disposed at such a distance from the orifice 20 and is so protected by the washer 25 as to be outside of the destructive influence which the blow-off water may have on the material of which the packing is formed.

When the parts are in the position shown in Fig. 1 the free end of the plunger 22, which is formed complementally to the surface 15 of the diaphragm 14, is disposed in the plane of one side of the bore 13a most remote from the wall 14. Axially in this end of the plunger is threaded a stem 30 of a diameter approximating that of the port 17, and this stem carries a cleaner tip or point 31 of a diameter to fit the orifice 20 and of a length somewhat greater than the same.

When the valve structure, above described, is in place in a boiler plate 18, the orifice plug 19 is in communication with the water contained in the boiler and the plunger 22 is in its normal position in the bore 12a by reason of the spring 29. As said plunger clears the bore 13a of the water outlet branch 13 at this time, boiler water flows through the orifice 20 into the bore 11a and from there into the bore 13a for discharge.

Boiler water generally includes sludge and other particles of foreign matter in suspension and which are carried over with the blowdown water as it passes through the orifice 20. Particles of such solids tend to adhere to the surface of the orifice and which being of small diameter soon tends to choke. To relieve this condition, the knob 28 is forced inwardly, compressing the spring and at the same time, causing the plunger 22 to move toward the wall 14. As the plunger approaches said wall the point 31 passes through the port 17 and enters and passes through the orifice 20 to dislodge such foreign matter as may have accumulated therein and force the same back into the water in the boiler.

It is pointed out that the extremity of the orifice plug 19 projects beyond the extremity of the branch 11 and slightly into the water space of the boiler so that there are no recesses in which such foreign particles may find a lodgement for accumulation. Furthermore all particles dislodged by the point 31 fall into the water space and drop to the bottom thereof. It is also pointed out that the plunger may be actuated in its cleanout stroke by smartly striking the knob 28 with the heel of the hand or by grasping the knob and forcing the same inwardly with a pushing action.

In either instance, after a cleaning stroke of the plunger, so soon as actuating pressure is removed, the spring 29 expands and returns all parts to the normal position such as shown in Fig. 1, wherein the valve is in its continuous blowdown condition.

In Figs. 3 and 4 I have shown a structure of a somewhat modified form which is capable of being so operated as to cut or close off the blowdown action and maintain the parts in such position without the necessity of manually holding the parts in such position. This it is often desirable to do when the valve is applied to the boiler of a locomotive and such locomotive is standing in a railroad depot and for other reasons.

The parts are generally the same as shown in Fig. 1, except that instead of the knob 28 on the stem 23, I provide a lever 28a and omit the spring 29. I then fasten to one side of the body 10 an edgewise disposed bar 32 which extends parallel with the stem 23. In the upper edge of said bar I provide upwardly opening recesses 33 and 34 which are spaced apart a distance approximating the travel of the plunger 22 from its normal position shown in Fig. 1 to the closed position shown in Fig. 3.

When the plunger is in its closed position, the lever 28a is turned axially with the plunger and stem to engage in the recess 33. At this time the point 31 is disposed in the orifice and the end of the plunger 22 is engaged with or seated against the surface 15 of the wall 14.

To return the parts to blowdown condition the lever 28a is turned to free it from the recess 33 and then is drawn outwardly until the shoulder 27 on the plunger engages the washer 25. At this time the lever 28a is disposed to register with the recess 34 in the bar 32 and which lever is now turned axially to engage in said recess. This holds the valve in the open continuous blowdown condition.

Preferably the valve body 10 is made of steel. The point 31 is preferably made of Monel metal and the plunger, washer and nut, as well as the knob 28 is preferably made of brass.

The valve is of a simple but durable construction and may be easily actuated to function efficiently for its intended purpose.

While in describing the invention, I have referred in detail to the fine arrangement and construction of the parts mentioned, the same is to be considered only in the illustrative sense, so that I do not wish to be limited thereto except as may be specifically set forth in the appended claims.

I claim as my invention:

1. A blow off valve embodying therein a valve body having aligned water inlet and plunger receiving branches at opposite ends thereof and a water outlet branch leading from said body between said branches, a cross wall in and spaced from the extremity of said inlet branch and having an axial opening therethrough and defining a recess in the associated end of said inlet branch, a plug located in said recess with one end engaged with said cross wall and having an axial flow orifice therethrough in line with said opening in said cross wall, a plunger arranged for longitudinal movement in said valve body toward and away from said cross wall and passing through and extending beyond packing means in said plunger receiving branch of the body, and a point carried by one end of said plunger and capable of passing through said opening in said cross wall and through said orifice in said plug for removing accumulated foreign matter from and outwardly through the extremity of said orifice passage when said plunger is moved toward said cross wall.

2. A blow off valve embodying therein a valve body having aligned water inlet and plunger receiving branches at opposite ends thereof and a water outlet branch leading from said body between said branches, a cross wall in and spaced from the extremity of said inlet branch and having an axial opening therethrough and defining a recess in the associated end of said inlet branch, a plug threaded into said recess and having one extremity engaged with said cross wall and having its other extremity extending outwardly beyond the extremity of said water inlet branch and having an axial flow orifice therethrough in line with the opening in said cross wall, a plunger arranged for longitudinal movement in said valve body toward and away from said cross wall and passing through and extending beyond packing means in said plunger receiving branch of the body, and a point having a threaded engagement at one end in an associated end of the plunger and having a portion at the other end for passage through said opening in the cross wall and through said flow orifice in said plug for removing accumulated foreign matter from and outwardly through the extremity of said passage when said end of the plunger is engaged with said cross wall.

HENRY E. MAY.

REFERENCES CITED

The following references are of record in the file of this patent:

UNITED STATES PATENTS

| Number | Name | Date |
|---|---|---|
| 341,730 | Carver | May 11, 1886 |
| 408,919 | Michell | Aug. 13, 1889 |
| 490,955 | Fishburn | Jan. 31, 1893 |
| 726,395 | Bedworth | Apr. 28, 1903 |
| 807,243 | Chapin | Dec. 12, 1905 |
| 887,302 | Barnes | May 12, 1908 |
| 977,281 | DeVilbiss | Nov. 29, 1910 |
| 1,508,635 | Woodham | Sept. 16, 1924 |
| 1,679,219 | Huff | July 31, 1928 |
| 1,769,006 | Wilson et al. | July 1, 1930 |
| 1,801,959 | Hopkins | Apr. 21, 1931 |
| 2,082,953 | Gunderson | June 8, 1937 |
| 2,093,444 | Hubbard | Sept. 21, 1937 |
| 2,218,446 | Wright | Oct. 15, 1940 |
| 2,343,034 | Weber | Feb. 29, 1944 |